US006891915B2

(12) United States Patent
Clausen et al.

(10) Patent No.: US 6,891,915 B2
(45) Date of Patent: May 10, 2005

(54) CALCULATING CIRCUIT FOR DIVIDING A FIXED-POINT SIGNAL

(75) Inventors: Axel Clausen, Munich (DE); Moritz Harteneck, Munich (DE); Petyo Penchev, Munich (DE)

(73) Assignee: Infineon Technologies AG, Munich (DE)

( * ) Notice: Subject to any disclaimer, the term of this patent is extended or adjusted under 35 U.S.C. 154(b) by 193 days.

(21) Appl. No.: 10/303,394

(22) Filed: Nov. 25, 2002

(65) Prior Publication Data

US 2003/0128799 A1 Jul. 10, 2003

(30) Foreign Application Priority Data

Nov. 30, 2001 (DE) .......................................... 101 58 810

(51) Int. Cl.[7] .............................................. H03K 21/08
(52) U.S. Cl. .......................... 377/47; 377/115; 377/117
(58) Field of Search ............................ 377/47, 115, 117

(56) References Cited

U.S. PATENT DOCUMENTS

| | | | | | |
|---|---|---|---|---|---|
| 5,014,233 A | * | 5/1991 | Kihava et al. | ............... | 708/655 |
| 5,365,182 A | * | 11/1994 | King | .......................... | 327/115 |
| 5,673,215 A | * | 9/1997 | Tsay | ............................ | 708/656 |
| 5,903,486 A | * | 5/1999 | Curtet | ......................... | 708/655 |

FOREIGN PATENT DOCUMENTS

| | | | | | |
|---|---|---|---|---|---|
| DE | 69030772 T | * | 1/1998 | ............. | G06F/7/52 |
| DE | 69504192 T | * | 12/1998 | ............. | G06F/7/52 |

* cited by examiner

Primary Examiner—Margaret R. Wambach
(74) Attorney, Agent, or Firm—Jenkins, Wilson & Taylor, P.A.

(57) ABSTRACT

1. A calculating circuit for dividing a fixed-point input signal consisting of a sequence of n-bit-wide digital data values by an adjustable dividing factor $2^a$ for generating a divided fixed-point output signal, comprising: a signal input (2) for applying the data value sequence of the fixed-point input signal; a first addition circuit (6) which adds the digital data value present at the signal input (2) to a data value temporarily stored in a register (33) to form a max(n,a+1)+1-bit-wide first aggregate digital data value; a shift circuit (11) which shifts the first aggregate data value present by a data bits to the right so that the max(n,a+1)−a+1 higher-order data bits of the first aggregate data value are delivered at an output (12) of the shift circuit (11); a logic circuit (16) which logically ANDs the a lower-order data bits of the first aggregate data value with a logical data value in the case of a logically low output control signal of a control logic (53) and logically ORs these bits with the inverted logical data value in the case of a logically high output control signal of the control logic (53) and delivers them to the register (33) for temporarily storing the logically combined data value $(d_{v1}, d_{v2})$; a second addition circuit (37) which adds the data value delivered by the shift circuit (11) to a value one to form a second aggregate data value in the case of a logically high output control signal of the control logic (53); a signal output for delivering the sequence of the second aggregate data values as a divided fixed-point output signal; the control logic (53) delivering a logically high output control signal when the first aggregate data value is a negative number which cannot be divided by the dividing factor $2^a$ without remainder.

13 Claims, 4 Drawing Sheets

CALCULATING CIRCUIT FOR DIVIDING A FIXED-POINT SIGNAL

TECHNICAL FIELD

The invention relates to a calculating circuit for dividing a fixed-point input signal, consisting of a sequence of digital data values, by an adjustable dividing factor $2^k$ for generating a divided fixed-point output signal.

BACKGROUND ART

DE 690 30 772 T2 describes a divider for performing a fast arithmetic operation. The divider is used for generating a quotient by dividing a dividend by a divisor. A first latching device contains the dividend data characterizing the dividend. A second latching device contains the divisor data characterizing the divisor. An operational device generates either a sum or a difference between the dividend data and the divisor data. In the divider, a third latching device is also provided which is used for latching sign bit data. An inverting device is provided for inverting the sign bit data. The divider also contains a shifting device for sequentially shifting the inverted sign bit data from a least significant bit position when the inverted sign bit data from the inverting device are input whilst the inverted sign bit data are latched. A further shifting device is provided for arithmetically shifting the result data, generated by the operational device, by one bit to the left whilst a logical ZERO is stored in an LSB position. A control device is used for controlling the execution of the iterative division processing by controlling the operational device and the two shifting devices so that the operational device generates a sum or difference on the basis of the temporarily stored sign bit data. The second shifting device doubles the operation result generated by the operational device, the first latching device temporarily storing the doubled result.

DE 695 04 192 T2 describes a circuit arrangement for digitally performing a division operation according to the method of disregarding the intermediate remainder.

In many applications, it is necessary to divide a fixed-point signal, which consists of a sequence of n-bit-wide digital data values, by a fixed dividing factor.

FIG. 1 shows a calculating circuit for dividing an applied fixed-point input signal by an adjustable dividing factor for generating a divided fixed-point output signal according to the prior art. The conventional fixed-point dividing circuit shown in FIG. 1 has a signal input E for applying the fixed-point input signal to be divided. The fixed-point input signal consists of a sequence of n-bit-wide digital data values which are applied to the signal input E of the fixed-point dividing circuit via n data lines.

The sequence of n-bit-wide digital data values passes via internal data lines of the fixed-point dividing circuit to an addition circuit ADD which adds the applied digital data value of the fixed-point input signal to a data value temporarily stored in a register R. The register R is connected to the addition circuit ADD via k data lines for delivering a k-bit-wide temporarily stored digital data value. The addition circuit ADD adds the applied digital data value of the fixed-point input signal to the k-bit-wide data value temporarily stored in the register R to form an aggregate data value which has max(n,k)+1 data bits. The aggregate data value is delivered to a signal input of a splitting circuit SPLIT via data lines.

The splitting circuit splits the max(n.k)+1-bit-wide applied aggregate data value into a first data value which consists of a least significant data bits of the aggregate data value, and into a second data value which consists of the most significant data bits of the aggregate data value. The first data value is delivered via max(n,k)−k+1 data lines to a signal output A of the fixed-point dividing circuit. The noise added by the fixed-point dividing circuit can be filtered out by a subsequent digital filter. The second data value is temporarily stored in the register R via a data lines and fed back to the addition circuit ADD.

In the text which follows, the operation of the fixed-point dividing circuit according to the prior art as shown in FIG. 1 is explained by means of an example. In this example, the fixed-point dividing circuit divides the applied fixed-point input signal by a dividing factor of 4, the number of fed-back, least significant data bits of the second data value a delivered by the splitting circuit being=2. If a constant signal sequence of 4-bit-wide digital data values with a constant value of 3 (3=0011) is applied to the signal input E of the fixed-point dividing circuit, the fixed-point dividing circuit of the prior art as shown in FIG. 1 produces the following sequence of data values:

TABLE 1

| E | 3333 3333 . . . |
|---|---|
| R | 0321 0321 . . . |
| A | 0111 0111 . . . |

From the output data sequence A, the mean value of the output signal, which is 0.75 in the example shown, is calculated in a subsequent calculating circuit. The constant input signal having the value 3 is divided by the dividing factor 4 by the fixed-point dividing circuit to become the value ¾=0.75.

However, the conventional fixed-point dividing circuit of the prior art shown in FIG. 1 has the disadvantage that, in the case of an alternating input signal, the variance of the fixed-point output signal delivered by the fixed-point dividing circuit rises. If, for example, an alternating signal sequence with alternating digital data values +3, −3 is applied to the signal input E of the fixed-point dividing circuit of the prior art, the following data sequence is obtained. The negative data values are represented in binary form as two's complement, i.e. the positive data value +3 corresponds to the binary value 0011, and the negative data value −3 corresponds to the binary coded data value 1101.

TABLE 2

| E | +3 | −3 | +3 | −3 | +3 | −3 | +3 | −3 |
|---|---|---|---|---|---|---|---|---|
| R | 0 | 1 | 0 | 1 | 0 | 1 | 0 | 1 |
| A | +1 | −1 | +1 | −1 | +1 | −1 | +1 | −1 |

As can be seen, the conventional fixed-point dividing circuit delivers an output signal which fluctuates between the digital value +1 and −1 when an alternating input signal is present. Thus, the variance of the output signal is not zero.

When such a conventional fixed-point dividing circuit is used in a feedback-type control loop, the value delivered by the fixed-point dividing circuit will fluctuate and thus reduce the stability of the control.

For this reason, the calculating circuit represented in FIG. 2 was proposed. The calculating circuit represented in FIG. 2 was filed as a German patent application with the patent application number 100 55 659.0. The calculating circuit shown in FIG. 2 is used for dividing a fixed-point input signal which consists of a sequence of n-bit-wide digital data values and which is present at the signal input F. The fixed-point input signal is divided by an adjustable dividing factor $2^k$ for generating a divided fixed-point output signal. The calculating circuit exhibits a signal input F for applying a data value sequence of the fixed-point input signal. The calculating circuit also contains a first addition circuit ADD which adds the digital data value present at the signal input E to a data value temporarily stored in a register R to form a max(n,k+1)+1-bit-wide first aggregate digital data value. A shift circuit SPLIT shifts the applied first aggregate data value formed to the right by a data bits so that the max(n, k+1)−k+1 higher-order data bits of the first aggregate data value are delivered to an output of the shift circuit SPLIT. The calculating circuit according to the prior art as shown in FIG. 2 also contains a logic circuit which logically ANDs the k lower-order data bits of the first aggregate data value to a logical data value or logically ORs these bits with the inverted logical data value in dependence on the sign of the first aggregate data value and delivers them to the register R for temporarily storing the logically combined data value $D_{v1}$, $D_{v2}$.

The calculating circuit of FIG. 2 also contains a second addition circuit ADD which adds the data value delivered by the shift circuit SPLIT to a stored value of one for eliminating the DC component in dependence on the sign of the first aggregate data value to form a second aggregate data value. A sequence of the second aggregate data values is delivered as a divided fixed-point output signal at a signal output A.

The two multiplexers MUX of the calculating circuit as shown in FIG. 2 are driven by a sign detection circuit. The sign detection circuit is used for detecting the sign of the first aggregate data value. When a positive sign of the first aggregate data value is detected by the sign detection circuit, the multiplexer of the second addition circuit ADD switches the data value delivered by the shift circuit SPLIT through to the signal output A of the calculating circuit. When a negative sign of the first aggregate data value is detected, the multiplexer of the second addition circuit ADD switches the second aggregate data value delivered by the adder through to the signal output A of the calculating circuit.

If the sign detection circuit detects a positive sign of the first aggregate data value, the first logically combined data value DV1 is switched through to the register R by the multiplexer and, when a negative sign of the first aggregate data value is detected by the sign detection circuit, the second logically combined data value DV2 is switched through to the register R by the multiplexer MUX. The logic A of the logic circuit shown in FIG. 2 is a logical AND circuit which logically ANDs the k lower-order data bits of the first aggregate data value formed with a logical data value. The logic B contained in the logic circuit is a logical OR circuit which logically ORs the k lower-order data bits of the first aggregate data value formed with the inverted logical data value. The logical data value is equal to the dividing factor which is reduced by the value 1. The dividing factor is a power value with the base two and the exponentiation factor k, the exponentiation factor k corresponding to the number of data bits which are shifted to the right by the shift circuit SPLIT.

The known calculating circuit shown in FIG. 2 supplies a divided fixed-point output signal which exhibits low variance with a fixed-point input signal sequence which also contains negative digital data values, as shown by the following example:

If a fixed-point input signal sequence of digital data values which alternate between +3 and −3 is applied to the signal input E of the calculating circuit, the data sequences specified below are obtained in the register R and at the output A of the calculating circuit:

TABLE 3

| E | −3 | +3 | −3 | +3 | −3 | +3 | −3 |
|---|---|---|---|---|---|---|---|
| R | 0 | −3 | 0 | −3 | 0 | −3 | 0 |
| A | 0 | 0 | 0 | 0 | 0 | 0 | 0 |

As can be seen by comparing the two tables 2, 3, both the fixed-point dividing circuit of the prior art as shown in FIG. 1 and the known calculating circuit as shown in FIG. 2 supply an output signal having the mean value 0. In the fixed-point dividing circuit according to FIG. 1, however, the output signal fluctuates between the value +1 and −1 whereas the output settles to a fixed value in the known calculating circuit according to FIG. 2.

The disadvantage of the known calculating circuit shown in FIG. 2 consists in that the output signal A is not completely free of DC components since the quantization characteristic is not completely symmetric.

In the known calculating circuit of the prior art as described in the patent application Ser. No. 100 55 659.0, the following output signal is obtained with a digital input signal in which the input values, for example, alternate between +5 and −5:

TABLE 4

| E | −5 | +5 | −5 | +5 | −5 | +5 |
|---|---|---|---|---|---|---|
| R | 0 | −1 | 0 | −1 | 0 | −1 |
| A | −1 | 1 | −1 | 1 | −1 | 1 |

If the same input signal sequence is selected, but with a different starting value, the following table is obtained:

TABLE 5

| E | +5 | −5 | +5 | −5 | +5 | −5 |
|---|---|---|---|---|---|---|
| R | 0 | 1 | −4 | 1 | −4 | 1 |
| A | 1 | 0 | 0 | 0 | 0 | 0 |

As can be seen by comparing Table 4 and Table 5, the output signal A is still free of mean or DC components after the settling process, but the two output signals A have a different variance depending on the starting value of the data sequence.

SUMMARY OF THE INVENTION

It is therefore the object of the present invention to provide a calculating circuit for dividing a fixed-point input signal in which the DC component of the output signal is minimal and in which the variance of the output signal is constant.

According to the invention, this object is achieved by a calculating circuit having the features specified in claim 1.

The invention provides a calculating circuit for dividing a fixed-point input signal consisting of a sequence of n-bit-wide digital data values by an adjustable dividing factor $2^k$ for generating a divided fixed-point output signal, comprising:

(a) a signal input for applying the data value sequence of the fixed-point input signal;

(b) a first addition circuit which adds the digital data value present at the signal input to a data value temporarily stored in a register to form a max(n,k+1)+1-bit-wide first aggregate digital data value;

(c) a shift circuit which shifts the first aggregate 10 data value present by a data bits to the right so that the max(n,k+1)−k+1 higher-order data bits of the first aggregate data value are delivered at an output of the shift circuit;

(d) a logic circuit which logically ANDs the k lower-order data bits of the first aggregate data value to a logical data value in the case of a logically low output control signal of a control logic and logically ORs these bits with the inverted logical data value in the case of a logically high output control signal of the control logic and delivers them to the register for temporarily storing the logically combined data value ($d_{v1}$, $d_{v2}$);

(e) a second addition circuit which adds the data value delivered by the shift circuit to a value one to form a second aggregate data value in the case of a logically high output control signal of the control logic;

(f) a signal output for delivering the sequence of the second aggregate data values as a divided fixed-point output signal;

(g) the control logic delivering a logically high output control signal when the first aggregate data value is a negative number which cannot be divided by the dividing factor $2^k$ without remainder.

Preferred embodiments of the calculating circuit according to the invention are specified in the subclaims.

BRIEF DESCRIPTION OF THE DRAWINGS

In the text which follows, a preferred embodiment of the calculating circuit according to the invention for dividing a fixed-point input signal by an adjustable dividing factor is described with reference to the attached figures for explaining features essential to the invention. In the figures.

DETAILED DESCRIPTION OF THE INVENTION

Figure 1:
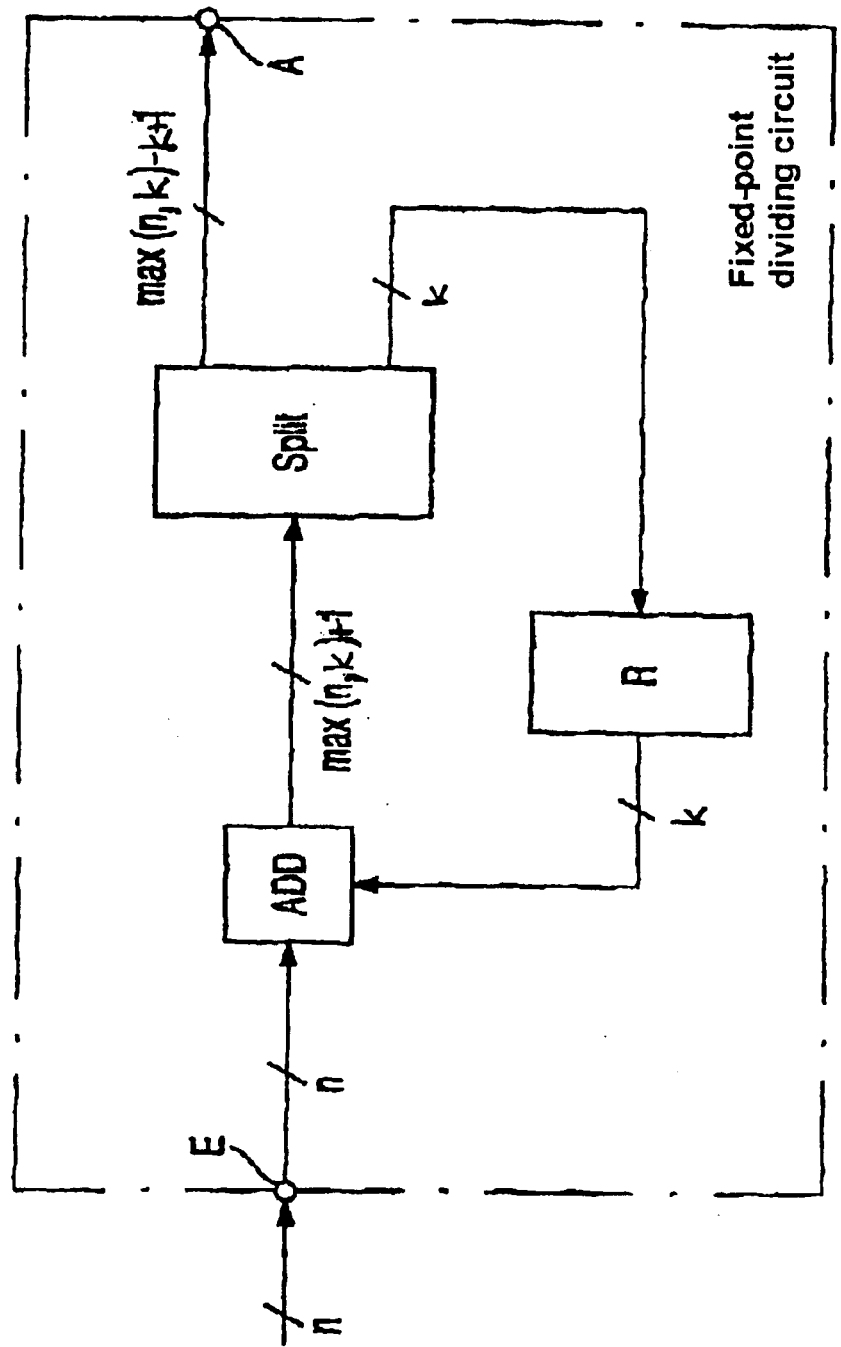
FIG. 1 shows a fixed-point dividing circuit of the prior art.
Figure 2:
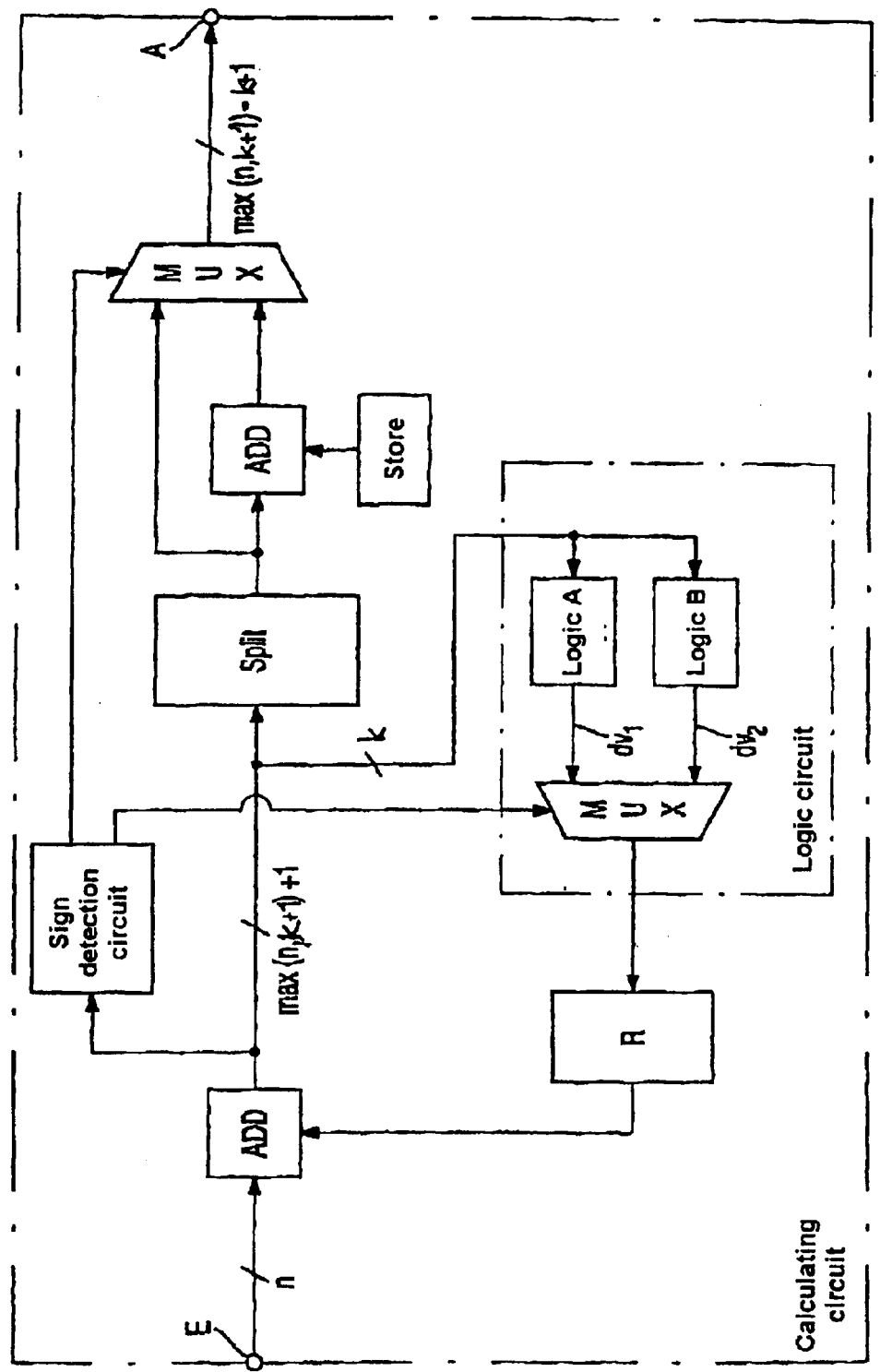
FIG. 2 shows a further fixed-point dividing circuit of the prior art.
Figure 3:
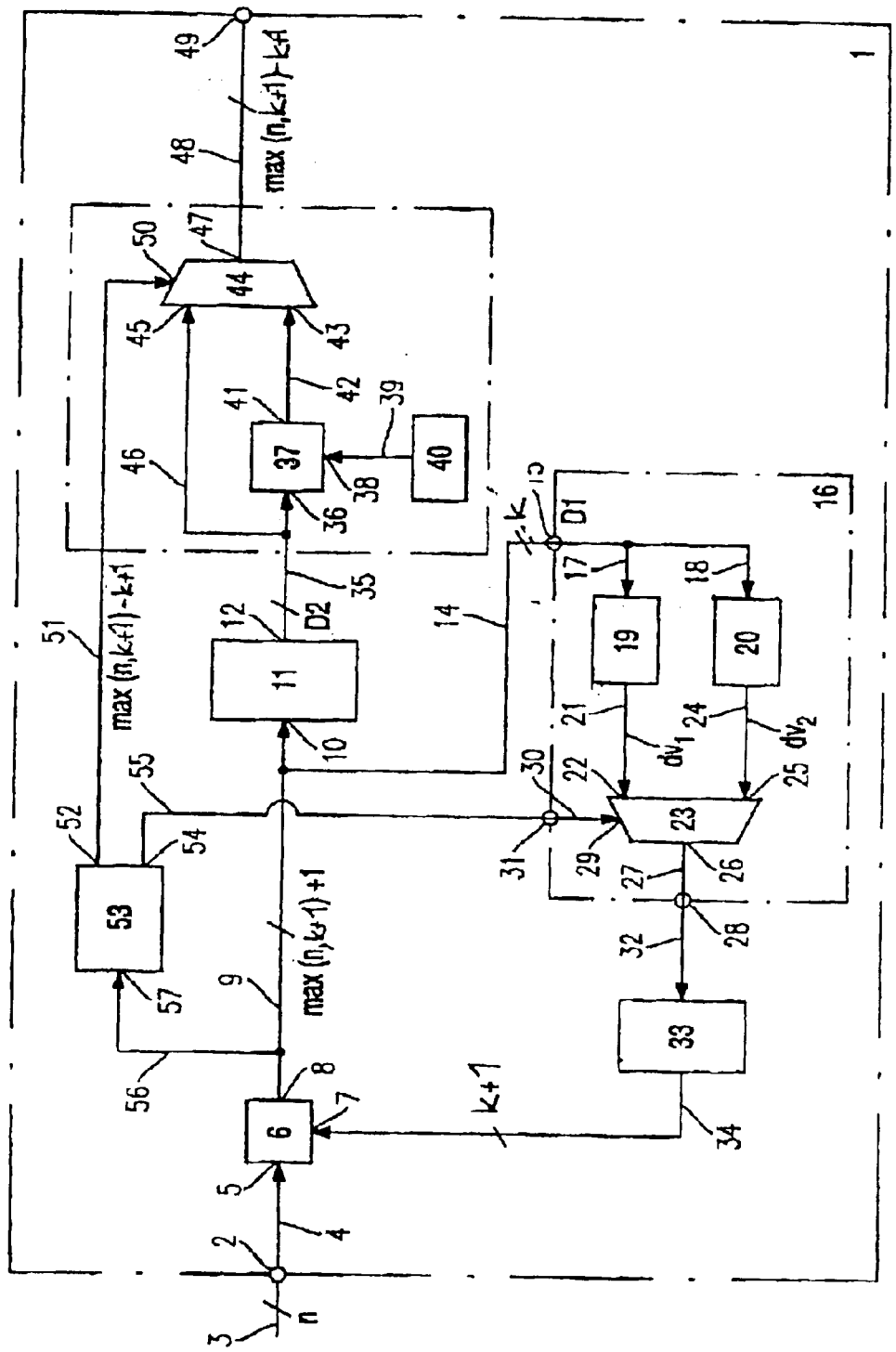
FIG. 3 shows a preferred embodiment of the calculating circuit according to the invention.

As can be seen from FIG. 3, the calculating circuit 1 according to the invention has a signal input 2 for applying a fixed-point input signal. The fixed-point input signal consists of a sequence of n-bit-wide digital data values which are supplied to the digital data input 2 of the calculating circuit 1 according to the invention via n data lines 3. The signal input 2 is connected to a first data input of an adder 6 via data lines 4. The adder 6 has a second data input and adds the digital values present at the two data inputs to form a first aggregate digital data value which has a width of max(n,k+1)+1 bits. The first aggregate digital data value formed by the addition circuit 6 is delivered by an output 8 of the addition circuit 6 to a digital data input 10 of a shift circuit 11 via data lines 9. The shift circuit 11 has a signal output 12. The shift circuit 11 shifts the first aggregate data value present at the data input 10 by k data bits to the right so that the lower-order data bits are delivered to a second max(n,k+1)−k+1 higher-order data bit of the aggregate data value at the output 12 of the shift circuit 11.

The k lower-order data bits of the first aggregate data value are applied to a signal input 15 of a logic circuit 16 via k data lines 14. In the logic circuit 16, the k lower-order data bits of the aggregate data value generated by the adder 6 are applied to a first logic circuit 19 and to a second logic circuit 20 via lines 17, 18. The first logic circuit 19 logically ANDs the applied data value D1 fed back with a stored logical data value and delivers the logically combined data value via data lines 21 to a first input 22 of a multiplexer 23. The second logic circuit 20 ORs the k-bit-wide data value D1 fed back with the inverted logical data value and delivers the logically combined data value to a second input 25 of the multiplexer 23 via lines 24. The multiplexer 23 has a signal output 26 which is connected to an output 28 of the logic circuit 16 via a line 27. The multiplexer 23 also has a control input 29 which is connected to a control input 31 of the logic circuit 16 via a line 30.

The output 28 of the logic circuit 16 is connected via 25 data lines 32 to a register 33 which temporarily stores the digital data value delivered by the multiplexer 23. The output of the register 33 is connected to the second input 7 of the addition circuit 6 by k+1 data lines 34.

The output 12 of the shift circuit 11 delivers the higher-order data bits of the aggregate data value generated by the adder 6 to a signal input 36 of a further adder 37 via max(n,k+1)−k+1 data lines 35. The adder 37 has a second signal input 38 which receives a digital data value one from a storage device 40 via data lines 39. The adder 37 has a signal output 41 which is connected to a signal input 43 of the multiplexer 44 via data lines 42. The multiplexer 44 has a further signal input 45 which is directly connected to the signal output 12 of the splitting circuit 11 via (n+1) lines 46. The multiplexer 44 has a signal output 47 which is connected to a signal output 49 of the calculating circuit 1 via data lines 48. The multiplexer 44 also has a control input 50 which is connected to an output 52 of a control logic 53 via a control line 51. The control logic 53 has a further output 54 which is connected to the control input 31 of the logic circuit 16 via a control line 55. The control logic 53 receives the aggregate data value formed by the first addition circuit 6 via data lines 56 and checks whether the aggregate data value present at the data lines 56 is a negative number which can be divided by a dividing factor $2^k$ without remainder. The control logic 53 drives the two multiplexers 44, 23 via the control lines 51, 55.

If the control logic 53 detects that the aggregate digital data value cannot be divided by the dividing factor $2^k$ without remainder, the control logic 53 delivers a logically low output control signal and the signal input 22 of the multiplexer 23 is switched through to the signal output 26 of the multiplexer 23 so that the data value formed by the first logic circuit 19 is written into the register 33 and temporarily stored.

If, conversely, the control logic 53 detects that the aggregate digital data value formed by the addition circuit 6 is a negative number which can be divided by a dividing factor $2^k$ without remainder, the control logic delivers a logically high output control signal and drives the multiplexer 23 via the control line 55 in such a manner that the signal input 25 of the multiplexer is switched through to the signal output 26 of the multiplexer 23. In this case, the data value formed by the second logic circuit 20 is written into the register 33 and temporarily stored.

If the control logic 53 detects that the first aggregate data value formed by the addition circuit 6 cannot be divided by the dividing factor $2^k$ without remainder, the control logic 53 delivers a logically low output control signal and the multiplexer 44 is driven via the control line 51 in such a manner that the signal input 45 of the multiplexer 44 is switched through to the signal output 47 of the multiplexer 44. The higher-order data bits delivered by the shift circuit 11 via the output 12 are switched through directly to the signal output 49 of the calculating circuit 1 in this manner.

If, conversely, the control logic 53 detects that the first aggregate digital data value formed by the addition circuit 6 is a negative number which can be divided by a dividing factor $2^k$ without remainder, the control logic 53 delivers a logically high output control signal and the other signal input 43 of the multiplexer 44 is switched through to the signal output 47 so that the aggregate data value formed by the addition circuit 37 is present at the signal output 49 of the calculating circuit 1. This aggregate data value is the sum of the second data value and a data value one added to it.

Figure 4:
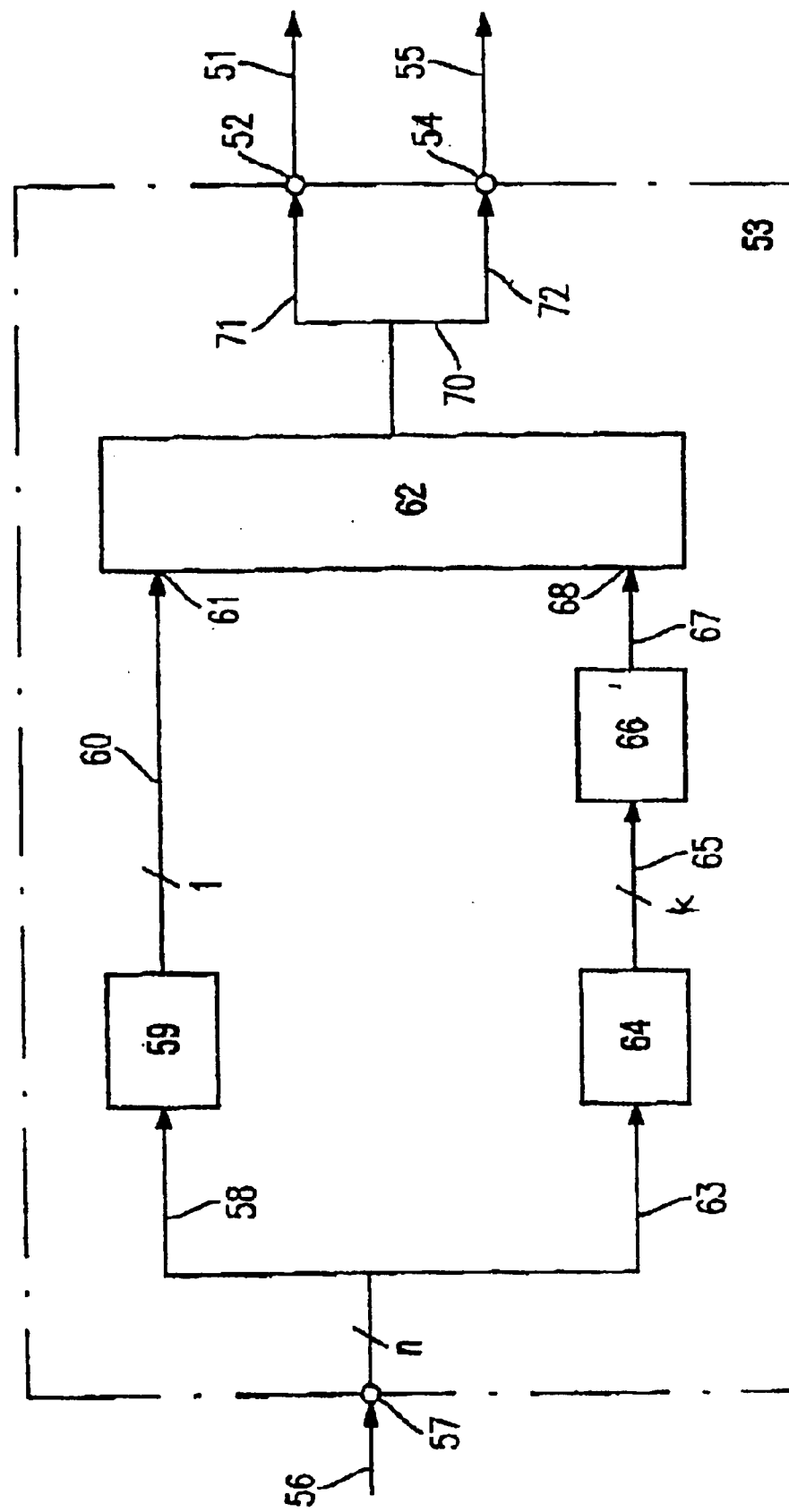
FIG. 4 shows a preferred embodiment of the control logic shown in FIG. 3.

FIG. 4 shows a preferred embodiment of the control logic 53 of the calculating circuit 1 according to the invention. The control logic 53 has a signal input 57 which receives the first aggregate data value from the first addition circuit 6 via the data lines 56. The first aggregate data value is supplied to an integrated sign detection circuit 59 via the internal data line 58. The output of the sign detection circuit 59 is connected to a first input 61 of a logical AND gate 62 via a line 60.

The first aggregate data value is also supplied to a logical AND circuit 64 via data lines 63. The logical AND circuit 64 logically ANDs the first aggregate data value present with a logical data value. The logical data value is preferably the dividing factor $2^k$ reduced by a value of one, the dividing factor $2^k$ being a power value with the base two and an exponentiation factor k. The exponentiation factor k corresponds to the number of data bits which are shifted to the right by the shift circuit 11. The k output lines 65 of the logical AND circuit 64 are logically ORed by an OR gate 66. The output of the OR gate 66 is connected to a second input 68 of the AND gate 62 via a line 67. The logical output signal present at an output 69 is branched at a branching node 70 and delivered to the control outputs 52, 54 of the control logic 53 via lines 71, 72 for driving the multiplexers 44, 23.

At the control outputs 52, 54, the control logic 53 supplies a logically high output control signal if a negative number which cannot be divided by the dividing factor $2^k$ without remainder is present at the signal input 57.

The calculating circuit 1 according to the invention divides the fixed-point signal present at the signal input 2 with a predetermined dividing factor $2^k$. The dividing factor is a power value with the base two and an exponentiation factor k. The exponentiation factor k corresponds to the number of data bits which are shifted to the right by the shift circuit 11. The logical data value $2^{k-1}$ with which the first data value fed back is logically combined by the logic circuits 19, 20 is equal to the dividing factor $2^k$ reduced by the data value one.

The logically combined data value $d_v$ delivered by the logic circuit 19 is thus:

$$d_{v1} = D_1 \text{AND}(2^k - 1) \quad (1)$$

The logically combined data value delivered by the logic circuit 20 is:

$$d_{v2} = D_1 \text{OR}[\text{NOT}(2^k - 1)] \quad (2)$$

where $D_1$ is the digital data value consisting of the lower-order data bits of the first aggregate data value.

The calculating circuit 1 according to the invention as shown in FIG. 3 always delivers, independently of the input signal sequence, an output signal A having the same variance as can be seen by comparing the two tables below.

TABLE 6

| E | −5 | +5 | −5 | +5 | −5 | +5 |
|---|----|----|----|----|----|----|
| R | 0  | −1 | 0  | −1 | 0  | −1 |
| A | 1  | −1 | 1  | −1 | 1  | −1 |

TABLE 7

| E | +5 | −5 | +5 | −5 | +5 | −5 |
|---|----|----|----|----|----|----|
| R | 0  | 1  | 0  | 1  | 0  | 1  |
| A | 1  | −1 | 1  | −1 | 1  | −1 |

The output signal A present at output 49 of the calculating circuit 1 is free of DC components and has a variance which is independent of the starting value of the input signal sequence at signal input 2.

The calculating circuit 1 according to the invention can be used, for example, in QAM demodulators. The calculation concerns estimated values which are free of DC values and with low noise for trigger frequencies, clock rates and phase angles. The calculating circuit 1 according to the invention reduces the variance of the output signal and thus the signal noise.

Various fields of application of noise shapers or, respectively, the calculating circuit 1 according to the invention are given in "A Minimal Multibit Digital Noise Shaping Architecture" in IEEE, 1996, pp. 5 to 7.

The calculating circuit according to the invention makes it possible to improve the architecture of noise shapers. The calculating circuit 1 according to the invention produces a significant increase in performance with minimum additional circuit expenditure.

List of Reference Numerals
1 Calculating circuit
2 Input
3 Lines
4 Lines
5 Input
6 Adder
7 Input
8 Output
9 Lines
10 Input
11 Splitting circuit
12 Output
14 Lines
15 Input
16 Logic circuit
17 Lines
18 Lines
19 Logic circuit
20 Logic circuit
21 Lines
22 Input
23 Multiplexer
24 Lines
25 Input
26 Output
27 Lines
28 Output
29 Control input
30 Lines
31 Control input
32 Lines 33 Register
34 Lines
35 Lines
36 Input
37 Adder
38 Lines
39 Lines
40 Store
41 Output
42 Lines
43 Input
44 Multiplexer
45 Input
46 Lines
47 Output
48 Lines
49 Output
50 Control input
51 Control line
52 Control output
53 Control logic
54 Control output
55 Control line
56 Lines
57 Input
58 Lines
59 Sign detection circuit
60 Line
61 Input
62 AND gate
63 Lines
64 Logical AND circuit
65 Line
66 OR gate
67 Line
68 Input
69 Output
70 Branching point
71 Line
72 Line

What is claimed is:

1. A calculating circuit for dividing a fixed-point input signal consisting of a sequence of n-bit-wide digital data values by an adjustable dividing factor $2^k$ for generating a divided fixed-point output signal, comprising:

(a) a signal input for applying the data value sequence of the fixed-point input signal;

(b) a first addition circuit which adds the digital data value present at the signal input to a data value temporarily stored in a register to form a first aggregate data value;

(c) a shift circuit which shifts the first aggregate data value present by k data bits to the right so that higher-order data bits of the first aggregate data value are delivered at an output of the shift circuit;

(d) a logic circuit which logically ANDs the k lower-order data bits of the first aggregate data value with a logical data value in the case of a logically low output control signal of a control logic and logically ORs these bits with an inverted logical data value in the case of a logically high output control signal of the control logic and delivers them to the register for temporarily storing the logically combined data value;

(e) a second addition circuit which adds the data value delivered by the shift circuit to one to form a second aggregate data value in the case of a logically high output control signal of the control logic;

(f) a signal output for delivering a sequence of the second aggregate data value as the divided fixed-point output signal;

(g) the control logic generating an output control signal which is logically high when the first aggregate data value is a negative number which cannot be divided by the dividing factor $2^k$ without remainder.

2. The calculating circuit as claimed in claim 1, wherein the logical data value is equal to the dividing factor $2^k$ reduced by one.

3. The calculating circuit as claimed in claim 1, wherein the logic circuit contains an inverter for inverting the logical data value.

4. The calculating circuit as claimed in claim 1, wherein the logic circuit has an AND gate for logically ANDing the logical data value with the k lower-order data bits of the first aggregate data value.

5. The calculating circuit as claimed in claim 1, wherein the logic circuit has an OR gate for logically ORing the inverted logical data value with the k lower-order data bits of the first aggregate data value.

6. The calculating circuit as claimed in claim 1, wherein the second addition circuit has an adder for adding the data value delivered by the shift circuit to one to form the second aggregate data value, and has a multiplexer which switches the data value delivered by the shift circuit when a logically low output control signal is output by the control logic and the second aggregate data value generated by a second adder when a logically high output control signal is output by the control logic to the signal output of the calculating circuit.

7. The calculating circuit as claimed in claim 1, wherein the dividing factor is a power value with the base two and an exponentiation factor k.

8. The calculating circuit as claimed in claim 1, wherein the exponentiation factor k corresponds to the number of data bits which are shifted to the right by the shift circuit.

9. The calculating circuit as claimed in claim 1, wherein the control logic has a sign detection circuit for detecting the sign of the first aggregate data value.

10. The calculating circuit as claimed in claim 9, wherein the control logic has a first logical AND gate for logically ANDing the first aggregate data value with the logical data value.

11. The calculating circuit as claimed in claim 9, wherein the sign detection circuit and a logical OR gate are connected to a second logical AND gate for generating the output control signal of the control logic.

12. The calculating circuit as claimed in claim 1, wherein the logic circuit has an AND gate for logically ANDing the logical data value with the k lower-order data bits of the first aggragate data value and further wherein the logic circuit has an OR gate for logically ORing the inverted logical data value with the k lower-order data bits of the first aggragate data value.

13. The calculating circuit as claimed in claim 12, wherein the logic circuit has a multiplexer comprising:

(a) a first input, which is connected to the output of the AND gate, (b) a second input, which is connected to the output of the OR gate, (c) an output, which is connected to the register, and comprising a control input, which is driven by the control logic.

* * * * *